(12) United States Patent
Yamada (10) Patent No.: US 6,296,070 B1
(45) Date of Patent: Oct. 2, 2001

(54) TRANSFER DEVICE IN A FOUR-WHEEL DRIVE VEHICLE

(75) Inventor: Hiroaki Yamada, Hamamatsu (JP)

(73) Assignee: Suzuki Motor Corporation, Hamamatsu (JP)

( * ) Notice: Subject to any disclaimer, the term of this patent is extended or adjusted under 35 U.S.C. 154(b) by 0 days.

(21) Appl. No.: 09/324,492

(22) Filed: Jun. 2, 1999

(30) Foreign Application Priority Data

Jul. 31, 1998 (JP) .................................................. 10-230047

(51) Int. Cl.⁷ .......................... B62D 61/06; B60K 17/34
(52) U.S. Cl. ....................... 180/217; 180/233; 74/473.24
(58) Field of Search .................... 180/217, 233; 74/473.21, FOR 104, 473.25, 473.24, 473.27

(56) References Cited

U.S. PATENT DOCUMENTS

| | | | |
|---|---|---|---|
| 3,354,741 | * 11/1967 | Johnston, Jr. et al. | 74/473.24 |
| 3,529,487 | * 9/1970 | Dolan | 74/473.24 |
| 3,552,227 | * 1/1971 | Schroeder et al. | 74/473.24 |
| 3,747,425 | * 7/1973 | MacDonald | 74/473.24 |

FOREIGN PATENT DOCUMENTS

| | | |
|---|---|---|
| 6-80053 | 11/1994 | (JP) . |
| 08156625 A | 6/1996 | (JP) . |
| 10053045 A | 2/1998 | (JP) . |

* cited by examiner

Primary Examiner—Brian L. Johnson
Assistant Examiner—Matthew Luby
(74) Attorney, Agent, or Firm—Flynn, Thiel, Boutell & Tanis, P.C.

(57) ABSTRACT

A transfer device in a four-wheel drive vehicle is provided in a simple construction wherein even an overstroke does not affect the shift position and thus eliminates the need of a highly accurate control for stop positions. The transfer device includes a high-speed/low-speed shifting shaft and a two-wheel/four-wheel shifting shaft disposed side by side in proximity to each other. A first elliptic groove and a first semicircular groove are formed in an outer peripheral surface of the high-speed/low-speed shifting shaft in an axially spaced relation to each other and a second semicircular groove corresponding to the first elliptic groove and a second elliptic groove corresponding to the first semicircular groove are formed in an outer peripheral surface of the two-wheel/four-wheel shifting shaft in an axially spaced relation to each other. An axially moveable shifting yoke is loosely fitted on the first and second shifting shafts while embracing the shifting shaft portions corresponding to the first and second elliptic grooves and the first and second semicircular grooves. A first ball and a second ball are disposed within the shifting yoke between the shifting shafts. The first ball engages or disengages from the first elliptic groove and the second semicircular groove and the second ball engages or disengages with the first semicircular groove and the second elliptic groove, with axial movement of the shifting yoke. This arrangement requires only one actuator to move the shifting yoke axially and eliminates the need for select operation of a lever.

11 Claims, 9 Drawing Sheets

TRANSFER DEVICE IN A FOUR-WHEEL DRIVE VEHICLE

FIELD OF THE INVENTION

The present invention relates to a transfer device in a four-wheel drive vehicle and more particularly to a transfer device in a four-wheel drive vehicle provided with a plurality of switching mechanisms to change the running condition of the vehicle.

BACKGROUND OF THE INVENTION

In certain conventional four-wheel drive vehicles (4WD vehicles), a transfer device is installed integrally with a transmission. The transfer device has a plurality of switching mechanisms such as a two-wheel/four-wheel switching mechanism for switching over between two-wheel drive (2WD) and four-wheel drive (4WD) and a high-speed/low-speed switching mechanism for switching over between high speed (H) and low speed (L). These switching mechanisms are operated with operation of each shifting shaft which is actuated, for example, by operation of a lever.

Figure 11:
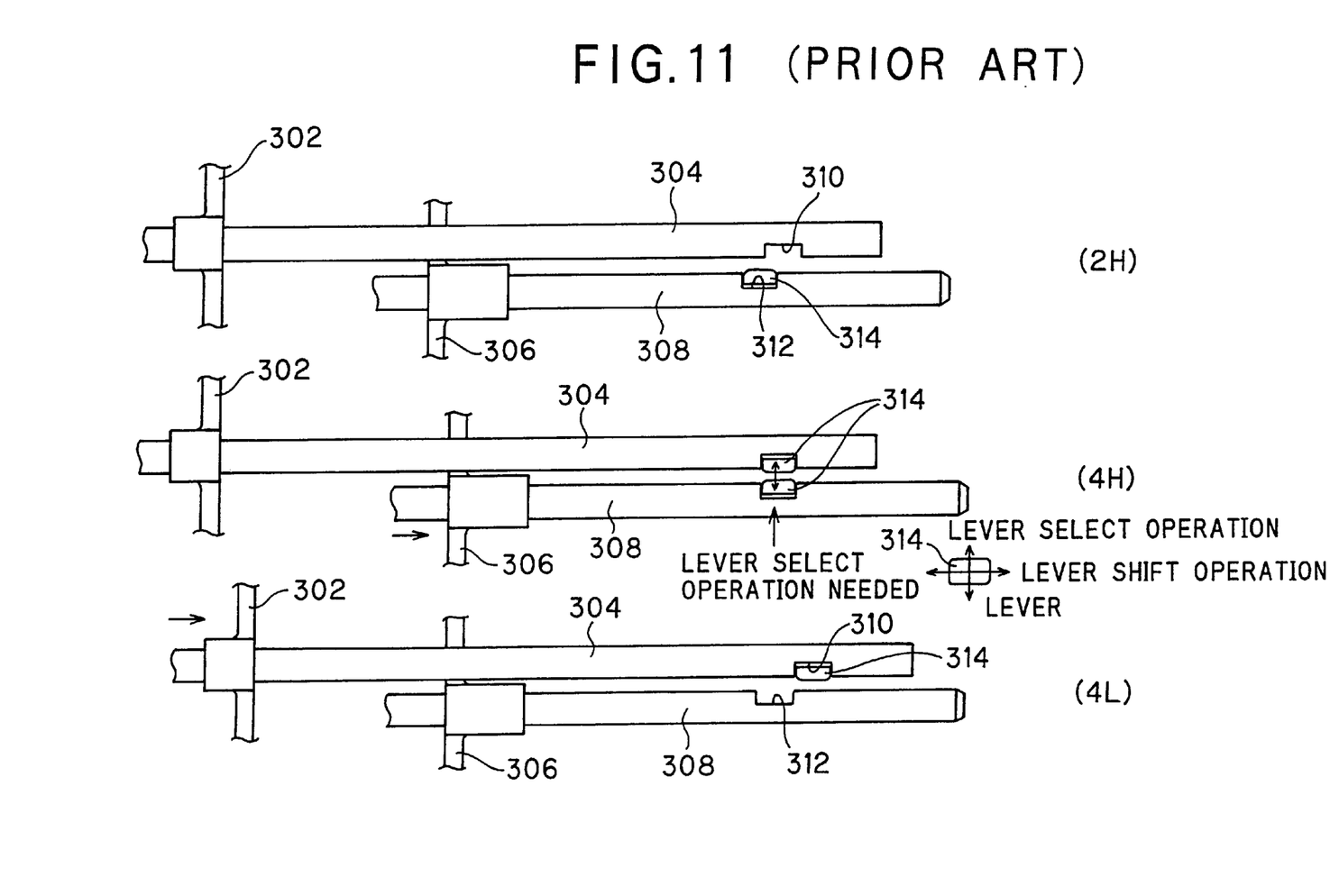
FIG. 11 is a diagram explaining operations of shifting shafts which require a select operation in a conventional transfer device.

In the transfer device shown in FIG. 11, a high-speed/low-speed shifting shaft 304 with a high-speed/low-speed fork 302 fixed thereto and a two-wheel/four-wheel shifting shaft 308 with a two-wheel/four-wheel fork 306 fixed thereto are disposed side by side in proximity to each other. A high-speed/low-speed shifting groove 310 is formed in the outer peripheral surface of the high-speed/low-speed shifting shaft 304, while a two-wheel/four-wheel shifting groove 312 corresponding to the high-speed/low-speed shifting groove 310 is formed in the outer peripheral surface of the two-wheel/four-wheel shifting shaft 308. A shift lever 314 comes into engagement with the high-speed/low-speed shifting groove 310 and the two-wheel/four-wheel shifting groove 312 selectively by shift and select operations, whereby the vehicular running condition is switched over between two-wheel drive (2WD) and four-wheel drive (4WD) or between high speed (H) and low speed (L).

Figure 12:
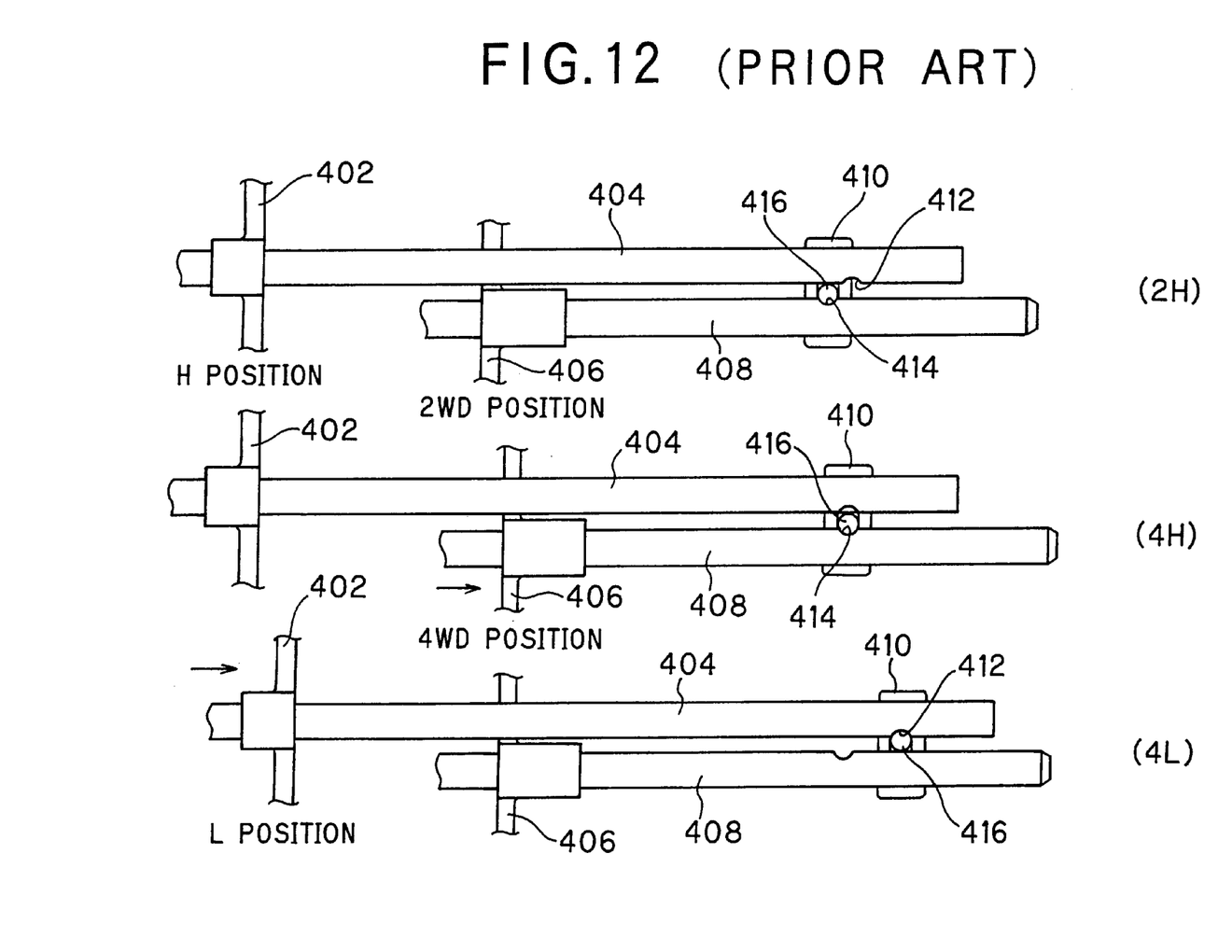
FIG. 12 is a diagram explaining operations of shifting shafts using an actuator without performing a select operation in a conventional transfer device.

For conducting the switching operations by utilizing an actuator without going through the select operation of the lever, there has heretofore been adopted such a construction as shown in FIG. 12, wherein a shifting yoke 410 is fitted on both a high-speed/low-speed shifting shaft 404 with a high-speed/low-speed fork 402 fixed thereto and a two-wheel/four-wheel shifting shaft 408 with a two-wheel/four-wheel fork 406 fixed thereto. A high-speed/low-speed semicircular groove 412 is formed in the outer peripheral surface of the high-speed/low-speed shifting shaft 404, while a two-wheel/four-wheel semicircular groove 414 corresponding to the high-speed/low-speed semicircular groove 412 is formed in the outer peripheral surface of the two-wheel/four-wheel shifting shaft 408. Further, a ball 416 is disposed within the shifting yoke 410 and is brought into engagement selectively with the high-speed/low-speed semicircular groove 412 and the two-wheel/four-wheel semicircular groove 414. Though not shown, when the high-speed/low-speed shifting shaft 404 and the two-wheel/four-wheel shifting shaft 408 are actuated for switch-over to high-speed two-wheel drive (2H), high-speed four-wheel drive (4H), or low-speed four-wheel drive (4L), by means of an actuator, there are used two types of actuators which are an actuator for shift operation and an actuator for select operation, or a three-stop position actuator is used.

Transfer devices of such a construction are disclosed, for example, in Japanese Patent Laid-Open Nos. 10-53045 and 8-156625 and Japanese Utility Model Laid-Open No. 6-80053. According to the transfer device disclosed in Japanese Patent Laid-Open No. 10-53045, a two-wheel/four-wheel switching shaft member and a high-speed/low-speed switching shaft member are disposed coaxially. The two-wheel/four-wheel switching shaft member operates in its axial direction independently of the high-speed/low-speed switching shaft member to effect switching between two-wheel drive and four-wheel drive, whereby it is intended to attain a reduction of size. According to the transfer device disclosed in Japanese Patent Laid-Open No. 8-156625, three shift positions four-wheel high-speed position (4H), four-wheel high-speed direct-coupled position (4HLc), and four-wheel low-speed direct-coupled position (4LLc)—are switched over from one to another using a single switching rail, thereby making the safety for on-road use and running performance for off-road use compatible with each other. The transfer device disclosed in Japanese Utility Model No. 6-80053 intends to simplify the construction thereof by switching in interlock with a lever.

However, in such conventional transfer devices, as shown in FIG. 11, a select operation of a shift lever is needed at the time of switching between two-wheel drive (2WD) and four-wheel drive (4WD) or between high speed (H) and low speed (L) with use of the shift lever, and this operation is troublesome.

Further, where the vehicular running condition is to be switched over to high-speed two-wheel drive (2H), high-speed four-wheel drive (4H), or low-speed two-wheel drive (4L), using an actuator, it has so far been necessary to use two types of actuators or use a three-stop position actuator. These actuators enhance the accuracy of stop positions (4H), particularly the accuracy of the middle stop position out of three stop positions. However, such an accuracy enhancing operation is troublesome.

SUMMARY OF THE INVENTION

The goal of the invention is elimination of the above-mentioned problems for a transfer device of a four-wheel drive vehicle. A preferred transfer device has at least two, first and second shifting shafts which actuate a plurality of switching mechanisms to change the running condition of the vehicle. The first and second shifting shafts are disposed side by side in proximity to each other. A first elliptic groove and a first semicircular groove are formed in an outer peripheral surface of the first shifting shaft in axially spaced relationship to each other and a second semicircular groove corresponding to the first elliptic groove and a second elliptic groove corresponding to the first semicircular groove are formed in an outer peripheral surface of the second shifting shaft in an axially spaced relationship to each other. An axially movable shifting yoke fits loosely on the first and second shifting shafts while embracing the shifting shaft portions corresponding to the first and second elliptic grooves and the first and second semicircular grooves. First and second balls are disposed within the shifting yoke and between the first and second shifting shafts. The first ball engages or disengages from the first elliptic groove and the second semicircular groove and the second ball engages or disengages from the first semicircular groove and the second elliptic groove, with axial movement of the shifting yoke.

DETAILED DESCRIPTION

Figure 1:
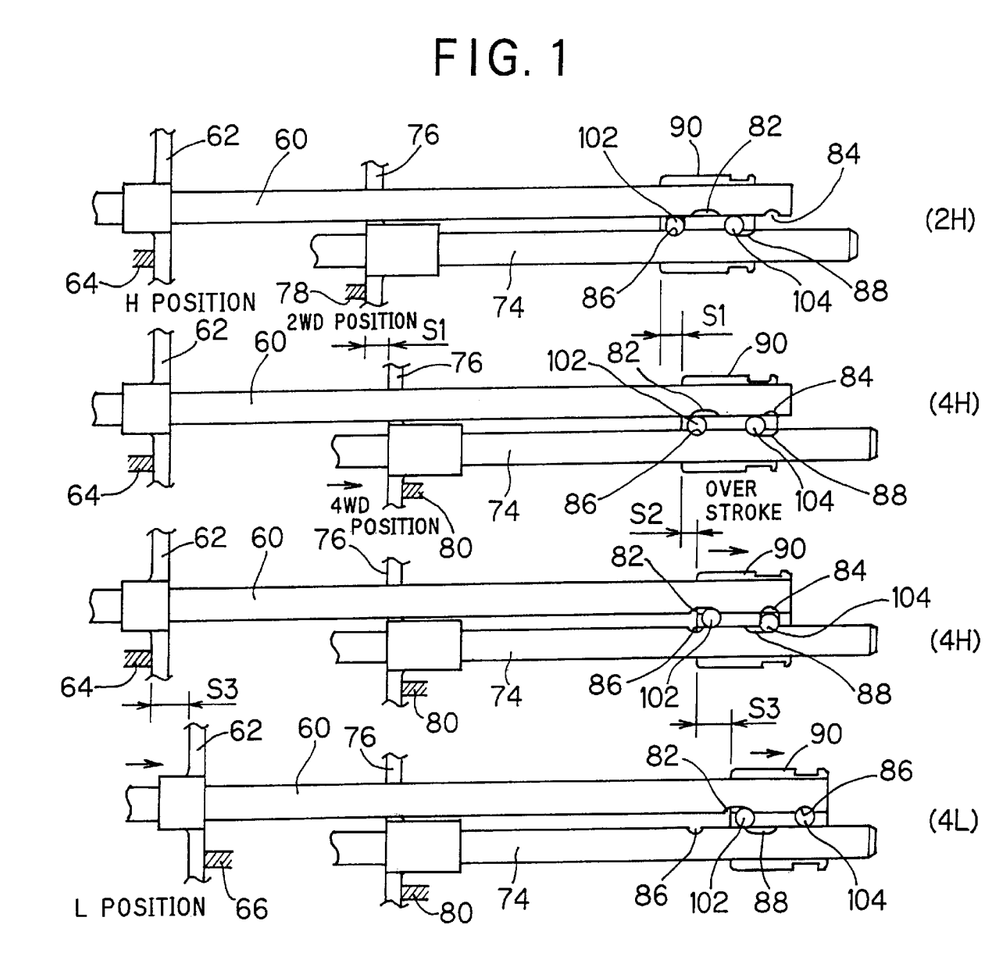
FIG. 1 is a diagram explaining operations of shifting shafts.
Figure 2:
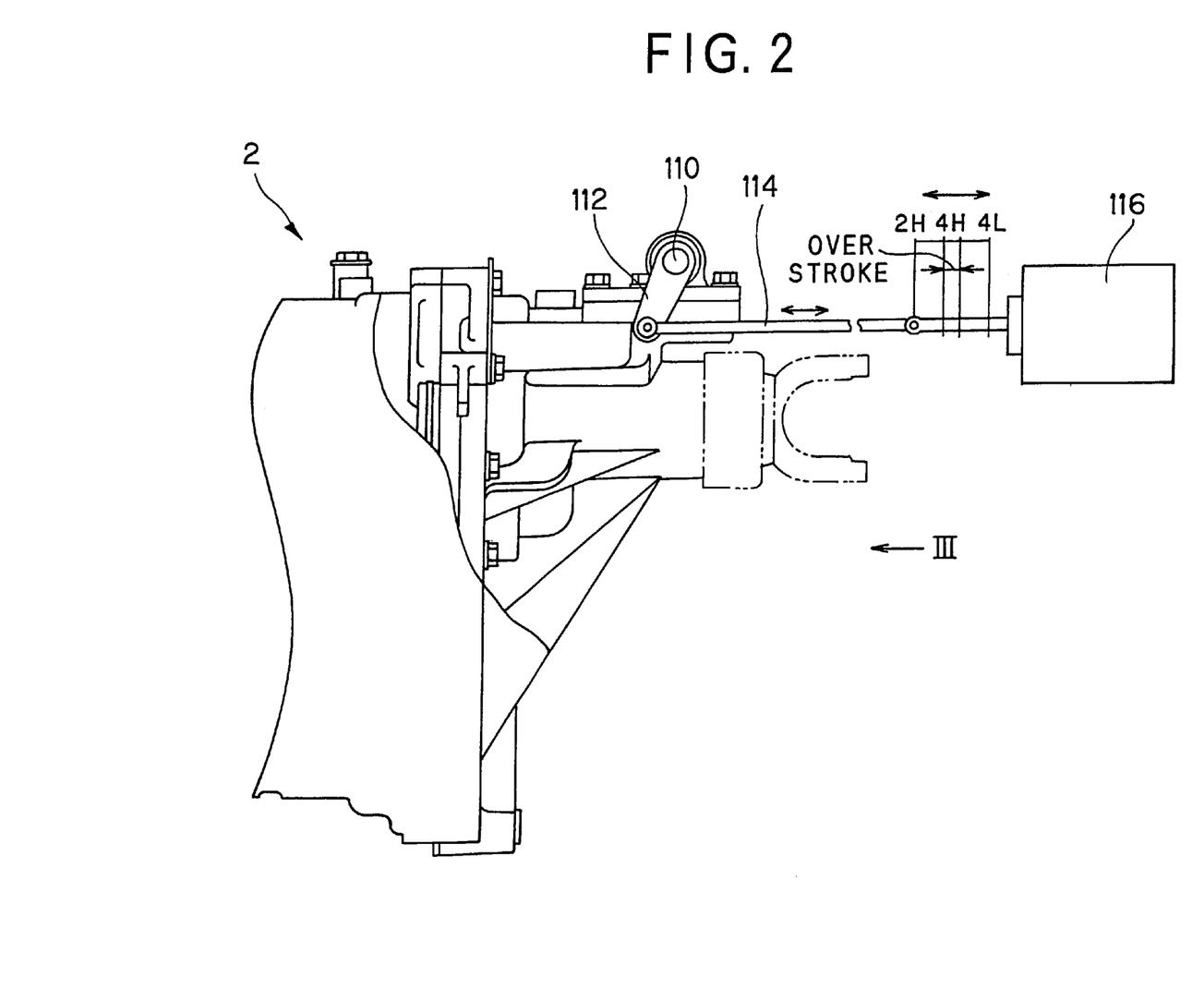
FIG. 2 is a partial side view of a transfer device according to a first embodiment of the present invention.
Figure 3:
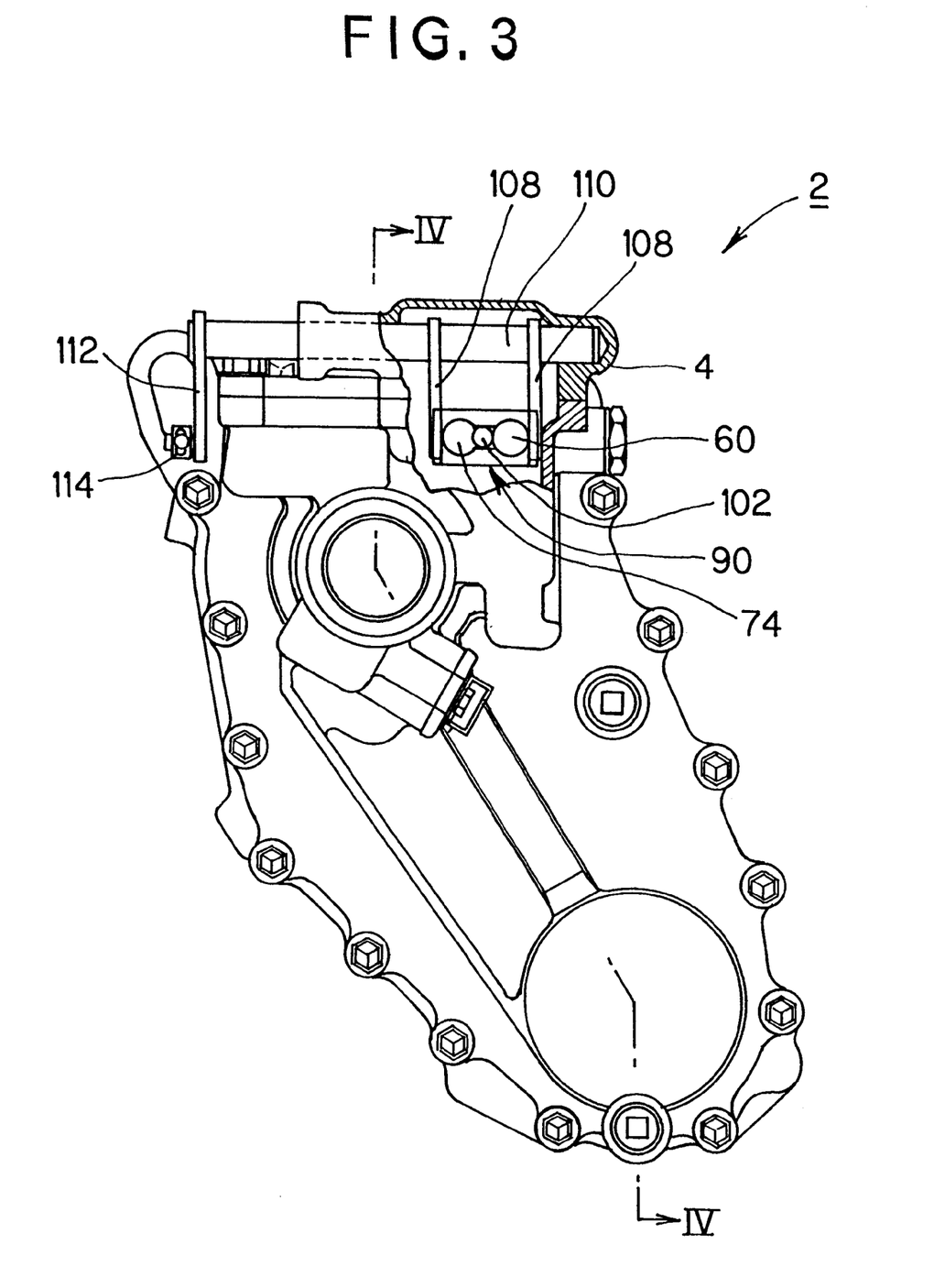
FIG. 3 is a sectional view of the transfer device as seen in the direction of arrow III in FIG. 2.
Figure 4:
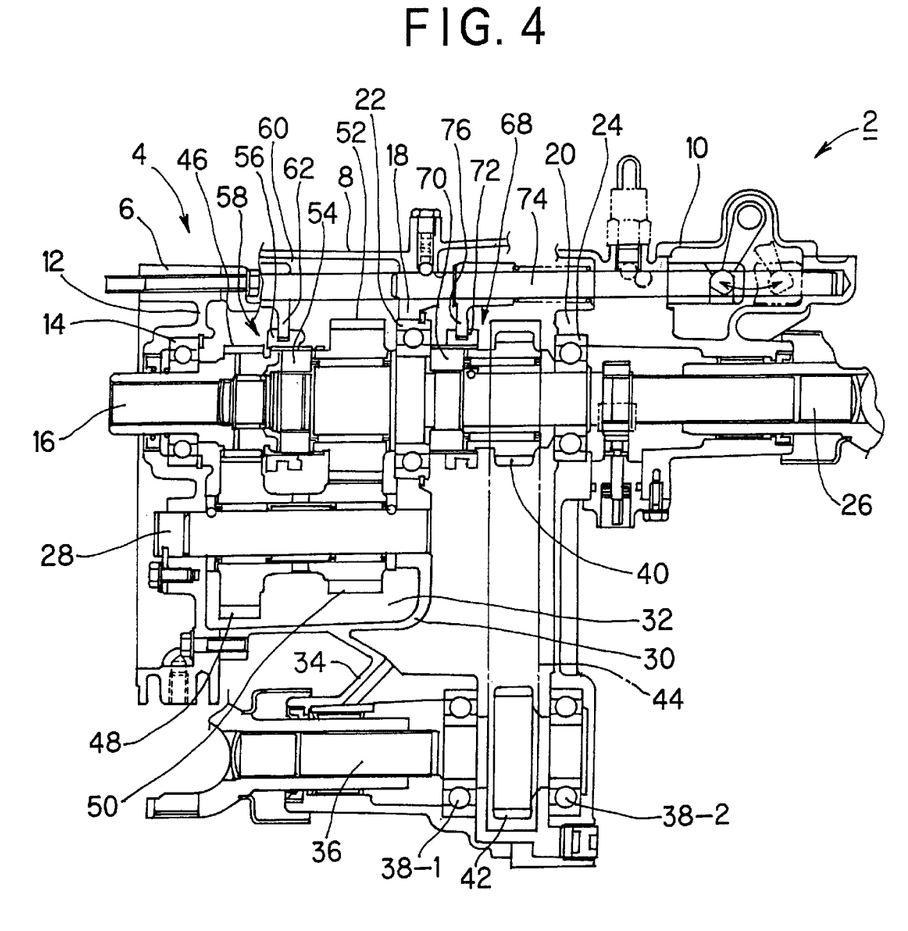
FIG. 4 is a sectional view taken on line IV—IV in FIG. 3.

Embodiments of the present invention will be described in detail and concretely hereunder with reference to the accompanying drawings. FIGS. 1 to 8 illustrate the first embodiment of the present invention. In FIGS. 2 to 4, the numeral 2 denotes a transfer for changing the running condition of a four-wheel drive vehicle (4WD vehicle) and numeral 4 denotes a transfer case. The transfer 2 is connected integrally to a transmission (not shown). The transfer case 4 comprises a front case 6, a center case 8 and a rear case 10. In a front wall portion 12 of the front case 6, a transfer input shaft 16 is supported rotatably by means of a front bearing 14. In a center wall portion 18 of the center case 8 and a rear wall portion 20 of the rear case 10, a transfer rear output shaft 26 is supported coaxially with the transfer input shaft 16 and rotatably by means of a center bearing 22 and a rear bearing 24.

Further, in the front wall portion 12 of the front case 6 and the center wall portion 18 of the center case 8, a transfer counter shaft 28 is mounted rotatably in parallel with both transfer input shaft 16 and transfer rear output shaft 26. The transfer counter shaft 28 is disposed within a gear chamber 32 which is defined by a chamber forming wall portion 30 contiguous to the center wall portion 18. In both a shaft support portion 34 contiguous to the chamber forming wall portion 30 of the center case 8 and the rear wall portion 20 of the rear case 10, a transfer front output shaft 36 is supported in parallel with the transfer rear output shaft 26 and rotatably by means of first and second driven bearings 38-1, 38-2.

Within the rear case 10, a transfer drive sprocket 40 is rotatably mounted on the transfer rear output shaft 26. Onto the transfer front output shaft 36 is fixed a transfer driven sprocket 42 corresponding to the transfer drive sprocket 40. A transfer chain 44 is entrained on both transfer drive sprocket 40 and transfer driven sprocket 42.

A transfer drive gear 46 is mounted on the transfer input shaft 16, while on the transfer counter shaft 28 is mounted a transfer driven gear 48 in mesh with the transfer drive gear 46. A decelerating drive gear 50 is mounted on the transfer counter shaft 28, while on the transfer rear output shaft 26 is mounted a decelerating driven gear 52 in mesh with the decelerating drive gear 50.

Figure 5:
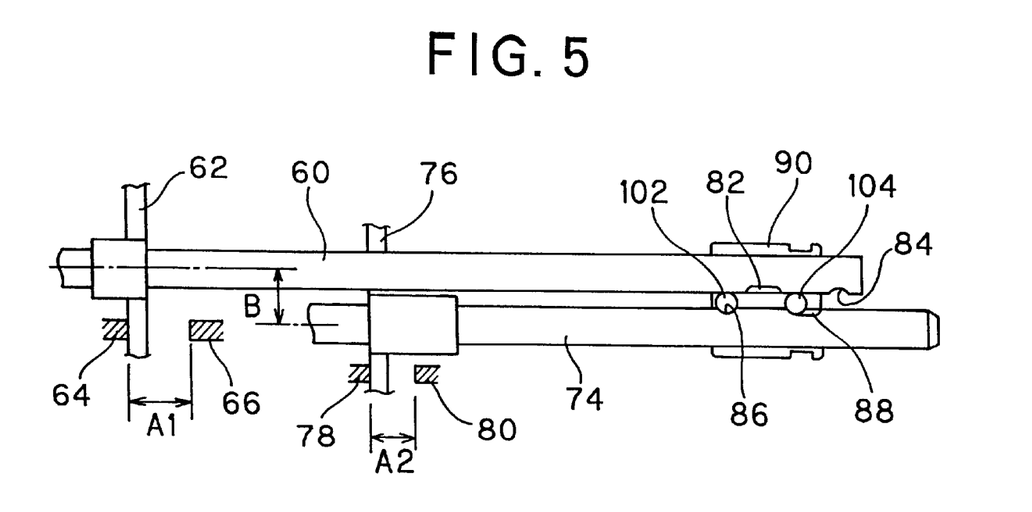
FIG. 5 is a diagram showing in what state shifting shafts are arranged.

Between the transfer drive gear 46 and the decelerating driven gear 52 is mounted a high-speed/low-speed switching mechanism 58 as the first switching mechanism which has a high-speed/low-speed hub 54 and a high-speed/low-speed sleeve 56. A high-speed/low-speed fork 62, which is fixed to the high-speed/low-speed shifting shaft 60 as the first shifting shaft, is engaged with the high-speed/low-speed sleeve 56. As shown in FIG. 5, an axial movement of the high-speed/low-speed shifting shaft 60 is limited by both high-speed-side stopper 64 and low-speed-side stopper 66 against which the high-speed/low-speed fork 62 comes into abutment. Both high-speed-side and low-speed-side stoppers 64 and 66 are provided in the transfer case 4 and are spaced apart a predetermined distance A1 from each other so as to sandwich the high-speed/low-speed fork 62 therebetween.

A two-wheel/four-wheel switching mechanism 68, as the second switching mechanism, is mounted on the transfer rear output shaft 26 at a position located on the transfer drive sprocket 40 relative to the center bearing 22. The two-wheel/four-wheel switching mechanism 68 connects and disconnects the driving force of the transfer rear output shaft 26 for the transfer drive sprocket 40 to switch over between two-wheel drive and four-wheel drive. The two-wheel/four-wheel switching mechanism 68, which comprises synchromesh components, has a two-wheel/four-wheel hub 70 and a two-wheel/four wheel sleeve 72 both fixed to the transfer rear output shaft 26. A two-wheel/four-wheel fork 76, which is fixed to a two-wheel/four-wheel shifting shaft 74 as the second shifting shaft, is engaged with the two-wheel/four-wheel sleeve 72. As shown in FIG. 5, an axial movement of the two-wheel/four-wheel shifting shaft 74 is restricted by both two-wheel-side stopper 78 and four-wheel-side stopper 80 against which the two-wheel/four-wheel fork 76 comes into abutment. Both two-wheel-side and four-wheelside stoppers 78, 80 are provided in the transfer case 4 and are spaced apart a predetermined distance A2 so as to sandwich the two-wheel/four-wheel fork 76 therebetween.

As shown in FIG. 5, the high-speed/low-speed shifting shaft 60 and the two-wheel/four-wheel shifting shaft 74 are disposed side by side in proximity to each other at a relatively short center distance B.

Figure 6:
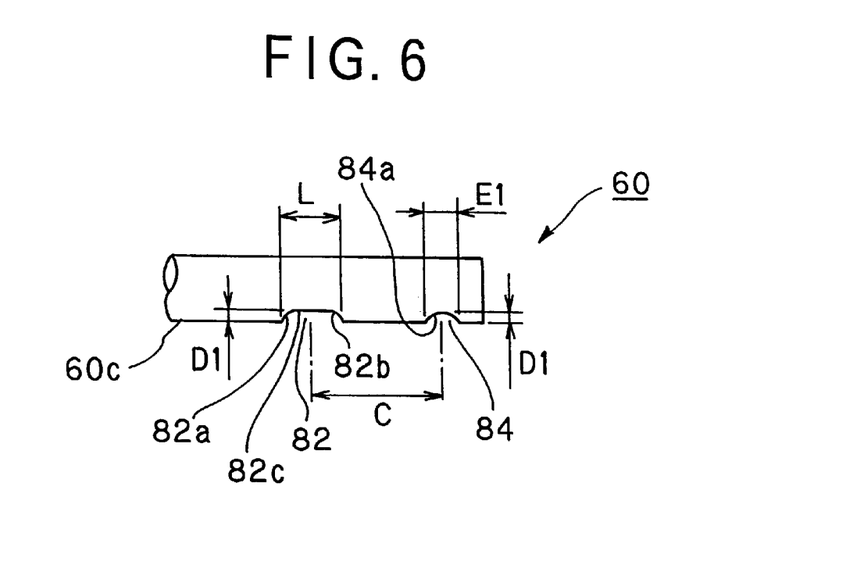
FIG. 6 is a partial side view of a high-speed/low-speed shifting shaft.

In an outer peripheral surface 60c of the high-speed/low-speed shifting shaft 60 which surface is located on the two-wheel/four-wheel shifting shaft 74 side there are formed a first elliptic groove 82 and a first semicircular groove 84 side by side, as shown in FIG. 6. Both grooves 82 and 84 are axially spaced a distance C from each other. The first elliptic groove 82 has a predetermined length L corresponding to an overstroke S2 of the two-wheel/four-wheel shifting shaft 74 and it is formed by a first one-side stepped spherical surface 82a, a first opposite-side stepped spherical surface 82b, and a first central flat surface 82b. The depth D1 of the first central flat surface 82b from the outer peripheral surface 60c is set a little smaller than the radius of a first ball 102 which will be described later. The first semicircular groove 84 is formed by a first spherical surface 84a having the above depth D1 and a length E1 which is a little smaller than the radius of a second ball 104 to be described later.

Figure 7:
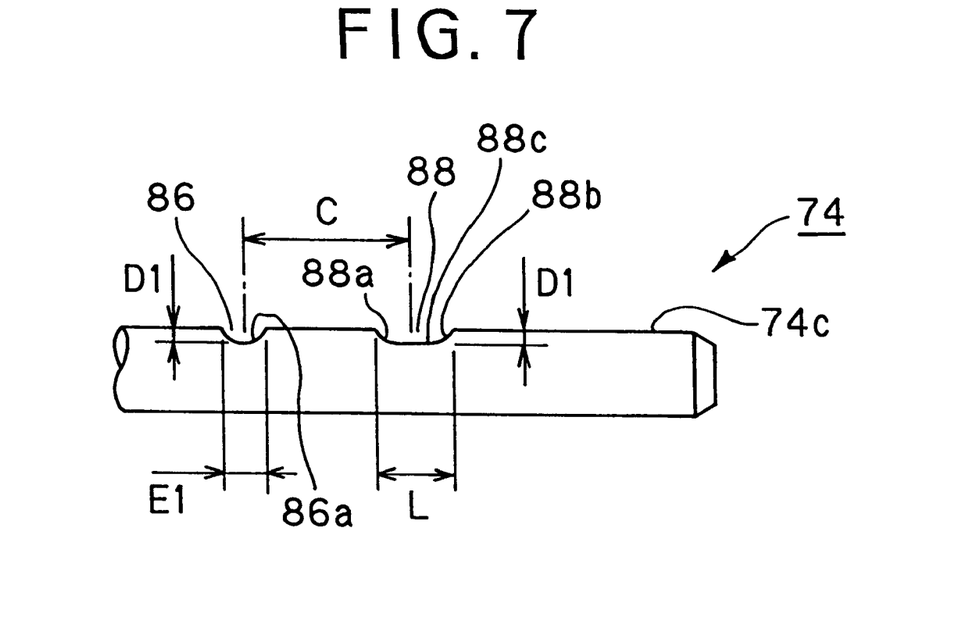
FIG. 7 is a partial side view of a two-wheel/four-wheel shifting shaft.

An outer peripheral surface 74c of the two-wheel/four-wheel shifting shaft 74 is located on the high-speed/low-speed shifting shaft 60 side. As shown in FIG. 7, there are formed a second semicircular groove 86 corresponding to the first elliptic groove 82 and a second elliptic groove 88 corresponding to the first semicircular groove 84. Both grooves 86 and 88 are formed side by side and are axially spaced a distance C from each other. The second semicircular groove 86 is formed by a second spherical surface 86a having the above depth D1 and a length E1 which is a little smaller than the radius of the first ball 102. The second elliptic groove 88 has the above length L and is formed by a second one-side stepped spherical-surface 88a, a second opposite-side stepped spherical surface 88b, and a second central flat surface 88c. The depth D1 of the second central flat surface 88c from the outer peripheral surface 74c is set a little smaller than the radius of the second ball 104.

In high-speed four-wheel drive (4H), the high-speed/low-speed shifting shaft 60 and the two-wheel/four-wheel shifting shaft 74 are installed in the transfer case 4 axially moveable so that the first elliptic groove 82 and the second semicircular groove 86 overlap each other and so do the first semicircular groove 84 and the second elliptic groove 88. According to this construction, in high-speed two-wheel drive (2H), the first ball 102 engages the second semicircular groove 86 and is disengaged from the first elliptic groove 82, while the second ball 104 engages the second one-side stepped spherical surface 88a of the second elliptic groove 88 and is disengaged from the first semicircular groove 84. In high-speed four-wheel drive (4H), the first ball 102 engages the second semicircular groove 86 and is positioned on the first one-side stepped spherical surface 82a of the first elliptic groove 82, while the second ball 104 is positioned on the second one-side stepped spherical surface 88a of the second elliptic groove 88 and is disengaged from the first semicircular groove 84. Further, in the event of overstroke of the two-wheel/four-wheel shifting shaft 74, the first ball 102 becomes disengaged from the second semicircular groove 86 and comes into engagement with the first opposite-side stepped spherical surface 82b of the first elliptic groove 82, while the second ball 104 is positioned on the second opposite-side stepped spherical surface 88b of the second elliptic groove 88 and is positioned in the first semicircular groove 84. In low-speed four-wheel drive (4L), the first ball 102 becomes disengaged from the second semicircular groove 86 and comes into engagement with the first opposite-side stepped spherical surface 82b of the first elliptic groove 82, while the second ball 104 is disengaged from the second elliptic groove 88 and engaged with the first semicircular groove 84.

A shifting yoke 90 is loosely fitted on both high-speed/low-speed shifting shaft 60 and two-wheel/four-wheel shifting shaft 74. The shifting yoke 90 is moved axially while embracing the shifting shaft portions corresponding to the first and second elliptic grooves 82, 88 and the first and second semicircular grooves 84, 86.

Figure 8:
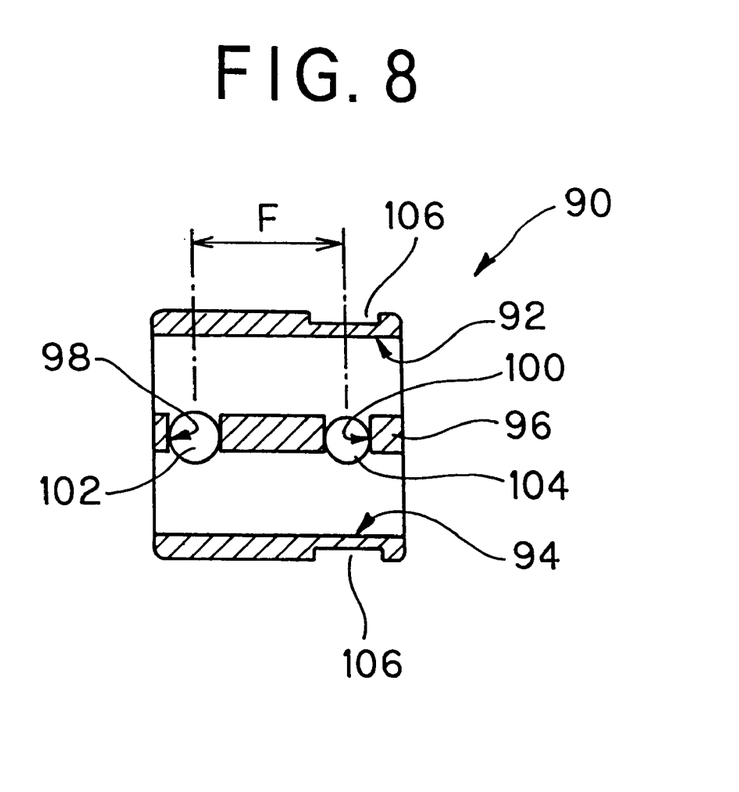
FIG. 8 is a sectional view of a shifting yoke.

In the shifting yoke 90, as shown in FIG. 8, a first bore 92 for insertion therein of the high-speed/low-speed shifting shaft 60 and a second bore 94 for insertion therein of the two-wheel/four-wheel shifting shaft 74 are axially formed side by side through a partition wall 96. In the partition wall 96 are formed a first ball hole 98 and a second ball hole 100 spaced a predetermined distance F from each other. Both holes 98 and 100 are formed radially so as to provide communication between the first and second bores 92, 94 and to permit a radial reciprocation of the first and second balls 102, 104, respectively. The first ball 102 is put in the first ball hole 98 so that it can reciprocate radially, and the second ball 104 is put in the second ball hole 100 also in a radially reciprocable manner. As noted previously, by axial movements of the shifting yoke 90, the first ball 102 is engaged with and disengaged from the first elliptic groove 82 and the second semicircular groove 86, while the second ball 104 is engaged with and disengaged with the first semicircular groove 86 and the second elliptic groove 88. In both axial outer side faces of the shifting yoke 90 are formed arm engaging grooves 106, 106 respectively. One end of swing arms 108, 108 are slidably engaged respectively with the arm engaging grooves 106, 106 of the shifting yoke 90.

As shown in FIGS. 3 and 4, the opposite sides of the swing arms 108, 108 are fixed onto a rotatable shaft 110. The rotatable shaft 110 extends in a direction orthogonal to both high-speed/low-speed shifting shaft 60 and two-wheel/four-wheel shifting shaft 74 and is rotatably secured to the transfer case 4. One end of a connection lever 112 is fixed to an end portion of the rotatable shaft 110 projecting from the transfer case 4. The opposite end of the connection lever 112 is connected to one end of a cable 114, whose opposite end is connected to a three-stop position actuator 116.

As shown in FIG. 2, the three-stop position actuator 116 has three stop positions—high-speed two-wheel drive (2H), high-speed four-wheel drive (4H), and low-speed four-wheel drive (4L). The actuator 116 causes the cable 114 to reciprocate, thereby causing the connection lever 112 to turn, with consequent rotation of the rotatable shaft 110, which rotation causes the swing arms 108 to turn, resulting in the high-speed/low-speed shifting shaft 60 and the four-wheel/two-wheel shifting shaft 74 reciprocating axially. In other words, the linear motion of the three-stop position actuator 46 is converted to a rotational motion by both connection lever 112 and rotatable shaft 110. This rotational motion is converted to a linear motion by sliding motion of one end of the swing arms 108 within the arm engaging grooves 106 of the shifting yoke 90, thus causing the shifting yoke 90 to reciprocate axially on both high-speed/low-speed shifting shaft 60 and two-wheel/four-wheel shifting shaft 74.

Next, the operation of this first embodiment will be described. In a high-speed two-wheel drive (2H), as shown in FIG. 1, the high-speed/low-speed fork 62 comes into abutment against the high-speed-side stopper 64, and the two-wheel/four-wheel fork 76 abuts the two-wheel-side stopper 78, whereby the axial movement of the high-speed/low-speed shifting shaft 60 and that of the two-wheel/four-wheel shifting shaft 74 are restricted.

At this time, the first ball 102 is engaged in the second semicircular groove 86 of the two-wheel/four-wheel shifting shaft 74 while contacting the outer peripheral surface 60c of the high-speed/low-speed shifting shaft 60, and the second ball 104 is in contact with the second one-side stepped spherical surface 88a of the second elliptic groove 88 formed in the two-wheel/four-wheel shifting shaft 74 while contacting the outer peripheral surface 60c of the high-speed/low-speed shifting shaft 60.

When the shifting yoke 90 is shifted axially from high-speed two-wheel drive (2H) to high-speed four-wheel drive (4H) by operation of the three-stop position actuator 116, the two-wheel/four-wheel shifting shaft 74 begins to move axially because the first ball 102 remains engaged in the second semicircular groove 86. The two-wheel/four-wheel shifting shaft 74 is stopped after moving by only the distance S1 because the two-wheel/four-wheel fork 76 comes into abutment against the four-wheel-side stopper 80, whereby the shift to high-speed four-wheel drive (4H) is completed. In this case, the shifting yoke 90 also moves axially by only the distance S1 together with the two-wheel/four-wheel shifting shaft 74.

Although the first ball 102 moves up to the position of the first elliptic groove 82, no shift operation is performed because the second ball 104 is engaged in the second one-side stepped spherical surface 88a of the second elliptic groove 88.

In high-speed four-wheel drive (4H), only the shifting yoke 90 overstrokes by the length L of the first and second elliptic grooves 82, 86 (indicated by distance S2) because the three-stop position actuator 116 does not control its stop positions with a high accuracy.

As a result of this overstroke of the shifting yoke 90, the first ball 102 is disengaged from the second semicircular groove 86 into contact with the outer peripheral surface 74c of the two-wheel/four-wheel shifting shaft 74 and at the same time enters the first elliptic groove 82 and comes into engagement with the first opposite-side stepped spherical surface 82b, but does not perform a shifting operation. Under the action of the four-wheel-side stopper 80, the two-wheel/four-wheel shifting shaft 74 does not move from the position of four-wheel drive (4WD). Further, since the second ball 104 slides up to the second opposite-side stepped spherical surface 88b within the second elliptic groove 88, no shifting operation is performed. Therefore, no matter at which position in the overstroke (S2) the shifting yoke 90 and the three-stop position actuator 116 may stop, the high-speed/low-speed shifting shaft 60 is held at the position of high speed (H) and the four-wheel/two-wheel shifting shaft 74 is held at the position of four-wheel drive (4WD). At this time, the first ball 102 is engaged with the first opposite-side stepped spherical surface 82b of the first elliptic groove 82.

The length L of each of the elliptic grooves 82 and 86 formed respectively in the shifting shafts 60 and 74 corresponds to the overstroke (S2) which is an anticipated overstroke in design, so the overstroke (S2) can be anticipated and made large if the length L is set large.

When the shifting yoke 90 is shifted from high-speed four-wheel drive (4H) to low-speed four-wheel drive (4L) by the three-stop position actuator 116, the shifting yoke 90 alone moves in the anticipated overstroke (S2). At the end position of the overstroke the first and second balls 102, 104 begin to engage the first semicircular groove 84, so that the high-speed/low-speed shifting shaft 60 is moved axially by a distance S3 up to abutment of the high-speed/low-speed fork 62 against the low-speed-side stopper 66, whereby the shift to low-speed four-wheel drive (4L) is completed. At this time, with the movement of the high-speed/low-speed shifting shaft 60, the shifting yoke 90 is also moved axially by the distance S3.

As to the shift from low-speed four-wheel drive (4L) to high-speed four-wheel drive (4H) or high-speed two-wheel drive (2H), it is effected by operations reverse to the above operations, so an explanation thereof will be omitted.

Thus, not only the high-speed-side and low-speedside stoppers 64, 66 are provided for the high-speed/low-speed shifting shaft 60, but also the two-wheel-side and four-wheel-side stoppers 78, 80 are provided for the two-wheel/four-wheel shifting shaft 74, so if an overstroke (S2) of the three-stop position actuator 116 is anticipated in high-speed four-wheel drive (4H), it is not necessary to control the actuator 116 stop positions with a high accuracy. Even an overstroke of the actuator 116 will not exert any influence on the shift position.

Moreover, the provision of only one actuator 116 eliminates the need of select operation and hence contributes to the simplification of construction. Besides, most of the interior components of the transfer 2 can be used as they are, thus increasing the compatibility of the components. Additionally, it enhances the freedom in designing the actuator 116.

Figure 9:
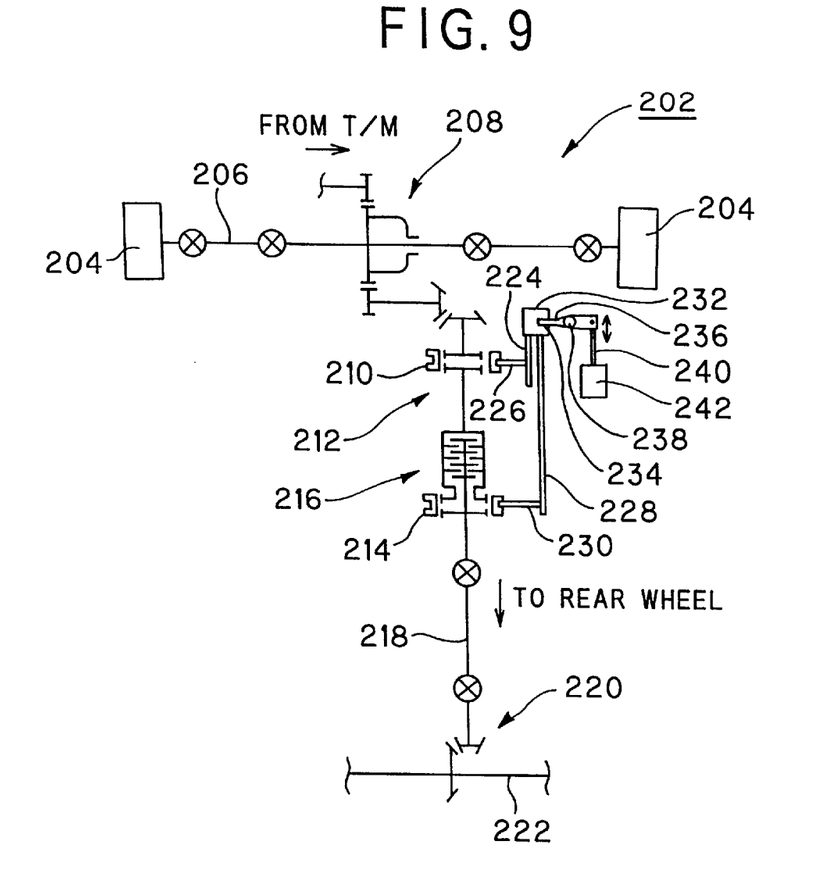
FIG. 9 is a schematic diagram of a vehicle in a second embodiment of the present invention.

FIG. 9 illustrates the second embodiment of the present invention. In the second embodiment to be described below, the portions which fulfill the same functions as in the above first embodiment will be identified by like reference numerals.

This second embodiment is characterized by the following arrangement. In a four-wheel drive vehicle 202, a front differential 208 which receives power from a transmission (not shown) is mounted on a front axle 206 provided with front wheels 204. A two-wheel/four-wheel switching mechanism 212 provided with a two-wheel/four-wheel sleeve 210 is installed in the front differential 208. A viscous coupling 216 provided with a coupling sleeve 214 is installed in the two-wheel/four-wheel switching mechanism 212. A propeller shaft 218 is connected to the viscous coupling 216. A rear differential 220 is mounted on the propeller shaft 218, and a rear axle 222 is connected to the rear differential 220.

Further, a two-wheel/four-wheel fork 226, which is fixed to a two-wheel/four-wheel shifting shaft 224 as the first shifting shaft, is engaged with the two-wheel/four-wheel sleeve 210. A full-time/rigid fork 230 is engaged with the coupling sleeve 216, the full-time/rigid fork 230 being fixed to a full-time/rigid shifting shaft 228 as the second shifting shaft.

A shifting yoke 232 is fitted on the shifting shafts 224 and 228 axially moveable in an embracing relation to the shafts. A connection lever 236, which is engaged with a yoke groove 234, is adapted to rotate about a lever shaft 238, whereby the shifting yoke 232 is moved axially. The connection lever 236 is actuated by means of a three-stop position actuator 242 through a cable 240.

According to the above construction of this second embodiment, the running condition of the vehicle can be switched over easily in three stages among 2WD, 4WD full time and 4WD rigid while utilizing the construction of the previous first embodiment.

Figure 10:
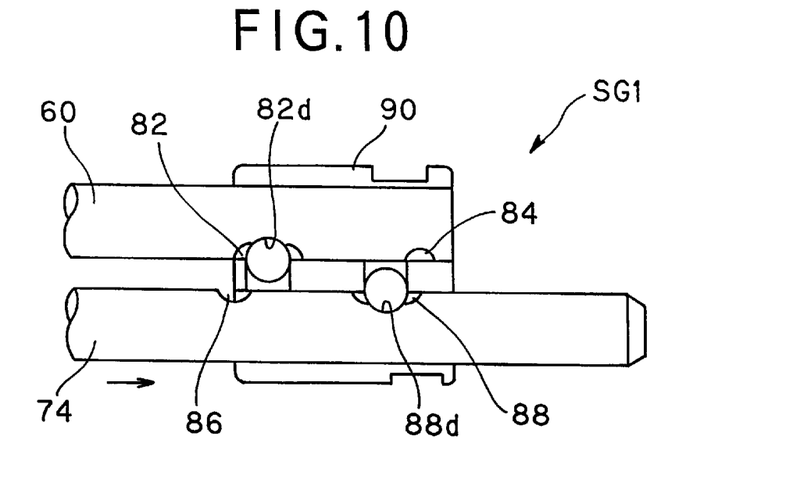
FIG. 10 is a partial enlarged view of shifting shafts in a third embodiment.

FIG. 10 illustrates the third embodiment of the present invention. The third embodiment is characterized by the following arrangement. In the first and second central flat surfaces 82b, 88c of the first and second elliptic grooves 82, 88 are formed first and second stop position determining grooves 82d, 88d at the stop position in conventional high-speed four-wheel drive (4H).

According to the above construction of this third embodiment, when the shifting yoke 90 overstrokes in high-speed four-wheel drive (4H), the first and second balls 102, 104 come into engagement with the first and second stop position determining grooves 82d, 88d, whereby an optimal position of the shifting yoke 90 in the high-speed four-wheel drive (4H) is determined. Therefore it is possible to check and improve the operability of the shifting yoke.

As will be apparent from the above detailed description, this construction eliminates the need of select operation with a lever. Further, the construction is simple because the provision of only one actuator suffices for moving the shifting yoke axially. Moreover, even in the event of overstroke of the actuator, no influence is exerted on the shift position and hence it is not necessary to control the stop positions of the actuator with a high accuracy. Further, common existing components can be used in this construction.

What is claimed is:

1. In a transfer device in a four-wheel drive vehicle, having at least first and second shifting shafts which actuate a plurality of switching mechanisms to change a running condition of the vehicle, the improvement wherein:

said first and second shifting shafts are disposed side by side in proximity to each other;

a first elliptic groove and a first semicircular groove are formed in an outer peripheral surface of said first shifting shaft in an axially spaced relation to each other;

a second semicircular groove corresponding to said first elliptic groove and a second elliptic groove corresponding to said first semicircular groove are formed in an outer peripheral surface of said second shifting shaft in an axially spaced relation to each other;

a shifting yoke is loosely fitted on said first and second shifting shafts while embracing shifting shaft portions corresponding to said first and second elliptic grooves and said first and second semicircular grooves, said shifting yoke being axially movable;

a first ball and a second ball are disposed within said shifting yoke and between said first and second shifting shafts, said first ball coming into engagement with or disengagement from said first elliptic groove and said second semicircular groove with the axial movement of said shifting yoke, and said second ball coming into engagement with or disengagement from said first semicircular groove and said second elliptic groove with the axial movement of said shifting yoke; and said shifting yoke is connected to a three-stop position actuator through a swing arm connected to the shifting yoke, a rotatable shaft with said swing arm fixed thereto, a connection lever fixed to said rotatable shaft and further through a cable connected to said connection lever, wherein the shifting yoke is capable of axially reciprocating movement by the three-stop position actuator through the cable, the connection lever, the rotatable shaft, and the swing arm.

2. A transfer device in a four-wheel drive vehicle according to claim 1, wherein said first shifting shaft comprises a high-speed/low speed shifting shaft and said second shifting shaft comprises a two wheel/four wheel shifting shaft.

3. A transfer device for a four-wheel drive vehicle, comprising:

first and second shifting shafts disposed side by side in proximity to each other;

a first groove and a second groove formed in an outer peripheral surface of said first shifting shaft in an axially spaced relation to each other;

a third groove corresponding to said first groove and a fourth groove corresponding to said second groove formed in an outer peripheral surface of said second shifting shaft in an axially spaced relation to each other;

a shifting yoke loosely fitted on said first and second shifting shafts while embracing shifting shaft portions corresponding to said first and fourth grooves and said second and third grooves, said shifting yoke being capable of axially reciprocating movement with respect to said shifting shafts; and a first ball and a second ball disposed within axially spaced holes in said shifting yoke and between said first and second shifting shafts, said first ball coming into engagement with or disengagement from said first groove and said third groove with the axial movement of said shifting yoke, and said second ball coming into engagement with or disengagement from said second groove and said fourth groove with the axial movement of said shifting yoke, wherein a single actuator for axial movement of said shifting yoke comprises a three-stop position actuator.

4. A transfer device in a four-wheel drive vehicle according to claim 3, wherein said shifting yoke is fitted on both a two-wheel/four-wheel shifting shaft as said first shifting shaft and a full-time/rigid shifting shaft as said shifting shaft.

5. A transfer device in a four-wheel drive vehicle according to claim 3, wherein said first shifting shaft comprises a high-speed/low speed shifting shaft and said second shifting shaft comprises a two wheel/four wheel shifting shaft.

6. A transfer device in a four-wheel drive vehicle according to claim 3, wherein said first shifting shaft comprises a high-speed/low speed shifting shaft and said second shifting shaft comprises a two wheel/four wheel shifting shaft.

7. In a transfer device in a four-wheel drive vehicle, said device having at least first and second shifting shafts that actuate a plurality of switching mechanisms to change a running condition of the vehicle, the improvement wherein:

said first and second shifting shafts are disposed side by side in proximity to each other;

first and second grooves are formed in an outer peripheral surface of said first shifting shaft in axially spaced relation to one another;

third and fourth grooves corresponding respectively to said first and second grooves are formed in an outer peripheral surface of said second shifting shaft in axially spaced relation to one another;

a shifting yoke is loosely fitted on said first and second shifting shafts while embracing shifting shaft portions corresponding to said first, second, third and fourth grooves first and second balls are disposed within said shifting yoke and between said first and second shifting shafts, said first ball moving into engagement with or disengagement from said first groove and said third groove by axial movement of said shifting yoke, and said second ball moving into engagement with or disengagement from said second groove and said fourth groove by axial movement of said shifting yoke;

a rotatable shaft has a swing arm secured thereto, and said swing arm is connected to said shifting yoke;

a connection lever is secured to said rotatable shaft; and a three-stop position actuator is connected to said connection lever by a cable.

8. A transfer device in a four-wheel drive vehicle according to claim 7, wherein said shifting yoke is moved axially by the operation of said three-stop position actuator.

9. A transfer device in a four-wheel drive vehicle according to claim 7, wherein said first groove comprises an elliptic groove and said fourth groove comprises an elliptic groove.

10. A transfer device in a four-wheel drive vehicle according to claim 9, wherein said second groove comprises a semicircular groove and said third groove comprises a semicircular groove.

11. A transfer device in a four-wheel drive vehicle according to claim 7, wherein said second groove comprises an elliptic groove and said fourth groove comprises an elliptic groove.

* * * * *